(12) United States Patent
Lei

(10) Patent No.: US 12,487,344 B2
(45) Date of Patent: Dec. 2, 2025

(54) DECOHERENT EFFECT PROCESSING DEVICE, DECOHERENT EFFECT PROCESSING SYSTEM, AND METHOD THEREOF

(71) Applicant: Ningbo ABAX Sensing Electronic Technology Co., Ltd., Ningbo (CN)

(72) Inventor: Shuyu Lei, Ningbo (CN)

(73) Assignee: Ningbo ABAX Sensing Electronic Technology Co., Ltd., Ningbo (CN)

( * ) Notice: Subject to any disclaimer, the term of this patent is extended or adjusted under 35 U.S.C. 154(b) by 1045 days.

(21) Appl. No.: 17/613,686

(22) PCT Filed: Oct. 9, 2019

(86) PCT No.: PCT/CN2019/110220
§ 371 (c)(1),
(2) Date: Nov. 23, 2021

(87) PCT Pub. No.: WO2020/237962
PCT Pub. Date: Dec. 3, 2020

(65) Prior Publication Data
US 2022/0236391 A1    Jul. 28, 2022

(30) Foreign Application Priority Data

May 31, 2019 (CN) .......................... 201910473270.7

(51) Int. Cl.
G01S 7/497      (2006.01)
G01S 7/4861     (2020.01)
G01S 7/4913     (2020.01)

(52) U.S. Cl.
CPC ............ G01S 7/497 (2013.01); G01S 7/4861 (2013.01); G01S 7/4913 (2013.01)

(58) Field of Classification Search
CPC ....... G01S 7/497; G01S 7/4861; G01S 7/4913
See application file for complete search history.

(56) References Cited

U.S. PATENT DOCUMENTS 10,469,776 B2 *  11/2019  Finateu ................. H04N 25/77
2007/0116477 A1 *  5/2007  Oberland ........... H04B 10/5162
                                                              398/188

(Continued)

FOREIGN PATENT DOCUMENTS

CN         101349755 A       1/2009
CN         101865997 A      10/2010

(Continued)

OTHER PUBLICATIONS

International Search Report, China, National Intellectual Property Administration, Application No. PCT/CN2019/110220, mailed Feb. 26, 2020, 4 pages.

*Primary Examiner* — Vincent H Tran
(74) *Attorney, Agent, or Firm* — ZIEGLER IP LAW GROUP, LLC.

(57) ABSTRACT

A decoherent effect processing device, a decoherent effect processing system, and a method therefor. A circuit comprises a signal acquisition module and a processing module, the output end of the signal acquisition module being connected to the input end of the processing module; the signal acquisition module is configured to acquire coherent light and convert the coherent light into a first signal having polarities; and the processing module is configured to depolarize the first signal to obtain related values of the first signal.

6 Claims, 4 Drawing Sheets

(56) References Cited

U.S. PATENT DOCUMENTS

| | | | | |
|---|---|---|---|---|
| 2010/0153062 A1* | 6/2010 | Maltseff | ................. | G01S 17/36 |
| | | | | 702/159 |
| 2010/0232017 A1* | 9/2010 | McCarthy | .............. | G02B 1/007 |
| | | | | 359/485.05 |
| 2015/0124242 A1* | 5/2015 | Pierce | .................... | G01S 7/497 |
| | | | | 356/5.01 |
| 2016/0149637 A1* | 5/2016 | Marsland, Jr. | ........ | H01S 3/0014 |
| | | | | 398/25 |
| 2018/0074198 A1 | 3/2018 | Novak et al. | | |
| 2018/0364354 A1* | 12/2018 | Chung | ...................... | G01J 4/00 |
| 2019/0253030 A1* | 8/2019 | Eken | .................... | G01S 7/4861 |

FOREIGN PATENT DOCUMENTS

| | | |
|---|---|---|
| CN | 102565806 A | 7/2012 |
| CN | 109031254 A | 12/2018 |

\* cited by examiner

DECOHERENT EFFECT PROCESSING DEVICE, DECOHERENT EFFECT PROCESSING SYSTEM, AND METHOD THEREOF

CROSS REFERENCE TO RELATED APPLICATION

The present application is the national phase of PCT International Application No. PCT/CN2019/110220, which claims priority to Chinese Patent Application No. 201910473270.7, titled "DECOHERENT EFFECT PROCESSING DEVICE, DECOHERENT EFFECT PROCESSING SYSTEM, AND METHOD THEREOF", filed on May 31, 2019 with the Chinese Patent Office, both of which are incorporated herein by reference in their entireties.

FIELD

The present disclosure relates to the field of laser radars, and in particular to a device for processing decoherence effect, a system for processing decoherence effect, and a method for processing decoherence effect.

BACKGROUND

With the development of science and technology, the use of laser for ranging has gradually entered people's lives.

In the conventional technology, a laser light emitted by a light source is reflected by a target object, and a returned signal light has low power due to long-distance transmission. Generally, the signal light reflected by the target object is loaded into a local light to obtain a coherent light having high power. The coherent light is incident on a receiving surface to output a current. A time when the current suddenly changes is determined as a time when the receiving surface receives the coherent light, and a distance between the light source and the target object is determined according to the time when the laser light is emitted and the time when the coherent light is received.

However, in the process of realizing the above solution in the conventional technology, it is found by the inventor that, after the coherent light is incident on the receiving surface, the current outputted by the receiving surface changes in a sine wave, resulting in a randomly distributed positive or negative polarity of the current of the output current of the pixel at different positions on the receiving surface. In this case, when summing the output current of each pixel to obtain the output current of the entire receiving surface, different pixels correspond to different polarities of the output current, so that the calculation result is distorted, which results in poor accuracy of laser ranging.

SUMMARY

An object of the present disclosure is to provide a device for processing decoherence effect processing, a system for processing decoherence effect, and a method for processing decoherence effect, to solve the problem of poor accuracy of laser ranging.

In order to achieve the above object, a device for processing decoherence effect is provided according to an embodiment of the present disclosure. The device includes: a signal acquisition module and a processing module. An output end of the signal acquisition module is connected to an input end of the processing module. The signal acquisition module is configured to acquire a coherent light and convert the coherent light into a first signal having a polarity. The processing module is configured to depolarize the first signal to obtain a correlation value of the first signal, where the correlation value is a value greater than 0.

Further, the processing module includes one of the following: a unidirectional conducting unit, a class B power amplifier, and a multiplier.

Further, the device further includes a conversion module. The conversion module is provided between the signal acquisition module and the processing module. The conversion module is configured to convert the first signal into a second signal.

Further, the processing module includes: a Gilbert unit having four input terminals and two output terminals. The four input terminals include a first input terminal, a second input terminal, a third input terminal and a fourth input terminal. The two output terminals include a first output terminal and a second output terminal. Both the first input terminal and the third input terminal of the Gilbert unit are connected with an output end of the conversion module to acquire the second signal. Both the second input terminal and the fourth input terminal of the Gilbert unit are connected to a reference signal input module to acquire a reference signal. The Gilbert unit is configured to: compare the second signal with the reference signal to obtain a relative difference, and determine a result of squaring the relative difference as the correlation value. A difference between a signal outputted from the first output terminal of the Gilbert unit and a signal outputted from the second output terminal of the Gilbert unit is the correlation value.

Further, the conversion module includes an amplifying circuit. One terminal of the amplifying circuit is connected to a signal input end, and the other terminal of the amplifying circuit is connected to the output end of the signal acquisition module. The amplifying circuit is configured to convert the first signal outputted by the signal acquisition module through a signal inputted from the signal input end, to obtain the amplified second signal.

Further, the amplifying circuit includes a common-gate amplifier.

Further, the common-gate amplifier includes a resistance unit and a first mos transistor. One end of the resistance unit is connected to the signal input end, and the other end of the resistance unit is connected to a drain of the first mos transistor. A source of the first mos transistor is connected to the output end of the signal acquisition module.

Further, the resistance unit includes: a second mos transistor, a second isolation element and a second capacitor. The signal input end is connected to one end of the second capacitor and a source of the second mos transistor. The other end of the second capacitor is connected to a gate of the second mos transistor and one end of the second isolation element. The other end of the second isolation element is connected to a drain of the second mos transistor and the drain of the first mos transistor.

Further, the reference signal input module includes: a first isolation element and a first capacitor. One end of the first capacitor is connected between the first isolation element and the processing module, and the other end of the first capacitor is grounded. The first capacitor is configured to: store charges corresponding to a third signal in a case that the first isolation element is conducting, where the third signal includes a signal into which the signal acquisition module converts a background light. The first isolation element is provided between the signal acquisition module and the processing module and is configured to control conducting or non-conducting between the signal acquisition module and the processing module, where in the case of conducting, the charges outputted by the signal acquisition module are transferred to the first capacitor, so that in the case of non-conducting, the signal in the case of conducting is inputted to the second input terminal and the fourth input terminal of the Gilbert unit.

A system for processing decoherence effect is further provided according to another embodiment of the present disclosure. The system includes: at least two devices for processing decoherence effect as described above, and a determining device. An input end of the determining device is connected to an output end of each of the devices for processing decoherence effect. The determining device is configured to add all correlation values to obtain a sum of the coherent light after decoherence.

Further, the system further includes a signal amplifying circuit. The signal amplifying circuit is provided between the determining device and the devices for processing decoherence effect. The signal amplifying circuit is configured to amplify the correlation value.

A method for processing decoherence effect is further provided according to another embodiment of the present disclosure. The method includes:
  acquiring a coherent light, and converting the coherent light into a first signal having a polarity; and
  depolarizing the first signal to obtain a correlation value of the first signal, where the correlation value is a value greater than 0.

Further, before depolarizing the first signal to obtain the correlation value of the first signal, the method further includes: converting the first signal into a second signal.

Further, the process of depolarizing the first signal to obtain the correlation value of the first signal includes: comparing the second signal with a reference signal to obtain a relative difference, and determining a result of squaring the relative difference as the correlation value.

Further, the process of converting the first signal into the second signal includes: converting the first signal through a signal to obtain the amplified second signal.

Further, after depolarizing the first signal to obtain the correlation value of the first signal, the method further includes: adding all correlation values to obtain a sum of the coherent light after decoherence.

With the above technical solutions, a device for processing decoherence effect, a system for processing decoherence effect, and a method for processing decoherence effect are provided. The device includes a signal acquisition module and a processing module. An output end of the signal acquisition module is connected to an input end of the processing module. The signal acquisition module is configured to acquire a coherent light and convert the coherent light into a first signal having a polarity. The processing module is configured to depolarize the first signal to obtain a correlation value of the first signal, where the correlation value is a value greater than 0. In this way, the first signal is depolarized, so that the correlation value greater than 0 can be processed, avoiding serious distortion of the calculation result caused due to the first signal of different polarities, thereby improving the accuracy of laser ranging.

Other features and advantages of the present disclosure are described in detail in the following specific embodiments.

BRIEF DESCRIPTION OF THE DRAWINGS

The accompanying drawings are given to provide a further understanding for the present disclosure and form a part of this specification. The accompanying drawings together with the following embodiments are used to explain the present disclosure and do not constitute a limitation to the present disclosure. In the accompanying drawings.

DETAILED DESCRIPTION OF EMBODIMENTS

Exemplary embodiments are described in detail hereafter, and examples thereof are shown in the accompanying drawings. In the following description related to the accompanying drawings, the same number in different drawings indicates the same or similar elements unless otherwise indicated. Implementations described in the following exemplary embodiments do not represent all implementations consistent with the present disclosure, and merely show examples of the device and the method consistent with some aspects of the present disclosure as detailed in the appended claims.

Figure 1:
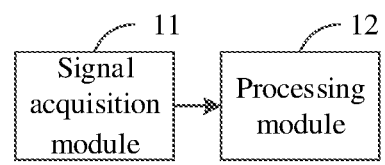
FIG. 1 is a schematic structural diagram showing a device for processing decoherence effect according to an embodiment of the present disclosure.

FIG. 1 is a schematic structural diagram showing a device for processing decoherence effect according to an embodiment of the present disclosure. As shown in FIG. 1, the device for processing decoherence effect includes: a signal acquisition module 11 and a processing module 12. An output end of the signal acquisition module 11 is connected to an input end of the processing module 12.

The signal acquisition module 11 is configured to acquire a coherent light and convert the coherent light into a first signal having a polarity.

The processing module 12 is configured to depolarize the first signal to obtain a correlation value of the first signal. The correlation value may be a value greater than 0.

The coherent light in this embodiment includes a light obtained by loading a signal light into a local light, where the signal light is formed by a target object reflecting a laser light emitted from a light source.

Specifically, after the light source emits the laser light to the target object, the signal light reflected back by the target object is generally loaded into the local light due to low power of the signal light, so as to obtain the coherent light. Further, the coherent light is outputted as a first signal varying in the form of a sine wave through the signal acquisition module 11. That is, a first signal polarity outputted by the signal acquisition module 11 may be positive or negative. For example, the first signal may be an analog signal. The signal having the polarity is inputted to the processing module 12. The first signal is depolarized by the processing module 12 to obtain the correlation value of the first signal, where the correlation value is a value greater than 0. The correlation value may be an absolute value of the first signal, or a value in proportion to the absolute value of the first signal. In addition, the correlation value may also be obtained by the following process. The first signal is controlled to pass through a resistor, to obtain a second signal when the first signal passes through the resistor. In this case, the correlation value may be an absolute value of the second signal, or a value in proportion to the absolute value of the second signal. The explanation of the correlation value herein is merely exemplary and is not limited thereto.

In this embodiment, the processing module 12 includes any one of the following: a unidirectional conducting unit, a class B power amplifier, and a multiplier.

Specifically, the unidirectional conducting unit is a circuit having the following characteristics. The first signal can only flow from an input end of the unidirectional conducting unit to an output end of the unidirectional conducting unit and cannot reversely flow from the output end of the unidirectional conducting unit to the input end of the unidirectional conducting unit. For example, the first signal of which the first signal polarity is positive can pass through the unidirectional conducting unit, and the first signal of which the first signal polarity is negative cannot pass through the unidirectional conducting unit, so that a correlation value outputted from the output end of the unidirectional conducting unit is the first signal whose polarity is positive. The unidirectional conducting unit may be implemented by a diode or a MOS transistor.

The class B power amplifier is an amplifying circuit that is conducting only in half a cycle. The class B power amplifier may be controlled to be conducting when the first signal varying in the form of a sine wave is positive and to be non-conducting when the first signal varying in the form of a sine wave is negative. For example, an input end of the class B power amplifier is connected to the output end of the signal acquisition module 11. In this case, the first signal of which the first signal polarity is positive can pass through the class B power amplifier, and the first signal of which the first signal polarity is negative cannot pass through the class B power amplifier, so that a correlation value outputted from an output end of the class B power amplifier is the first signal whose polarity is positive.

An input end of the multiplier is connected to the output end of the signal acquisition module 11. The first signal outputted by the signal acquisition module 11 may be squared to obtain the first signal whose polarity is positive, so that a correlation value outputted from an output end of the multiplier is the first signal whose polarity is positive.

In this embodiment, the signal acquisition module and the processing module are provided. The output end of the signal acquisition module is connected to the input end of the processing module. The signal acquisition module is configured to acquire the coherent light and convert the coherent light into the first signal having the polarity. The processing module is configured to depolarize the first signal to obtain the correlation value of the first signal, where the correlation value is a value greater than 0. In this way, the first signal is depolarized, so that the correlation value greater than 0 can be processed, avoiding serious distortion of the calculation result caused due to the first signal of different polarities, thereby improving the accuracy of laser ranging.

Figure 2:
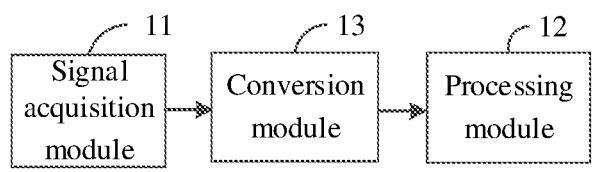
FIG. 2 is a schematic structural diagram showing a device for processing decoherence effect according to another embodiment of the present disclosure.

FIG. 2 is a schematic structural diagram showing a device for processing decoherence effect according to another embodiment of the present disclosure. As shown in FIG. 2, based on the above embodiments, the device for processing decoherence effect further includes a conversion module 13 provided between the signal acquisition module 11 and the processing module 12.

The conversion module 13 is configured to convert the first signal into a second signal.

Specifically, the first signal is converted into the second signal by the conversion module 13. The second signal obtained by the conversion of the conversion module 13 may be positive or negative. In this case, the processing module 12 processes the second signal to obtain the correlation value of the first signal, where the correlation value is a value greater than 0. For example, in this embodiment, the first signal may be a current, and the second signal may be a voltage.

The conversion module 13 may convert the first signal into the second signal in the following manners.

In a first manner, after the conversion module 13 obtains the first signal outputted by the signal acquisition module 11, the conversion module 13 outputs the second signal.

In a second manner, after the conversion module 13 obtains the first signal outputted by the signal acquisition module 11, the conversion module 13 outputs the second signal in the case of determining that the first signal is greater than a preset value.

Figure 3:
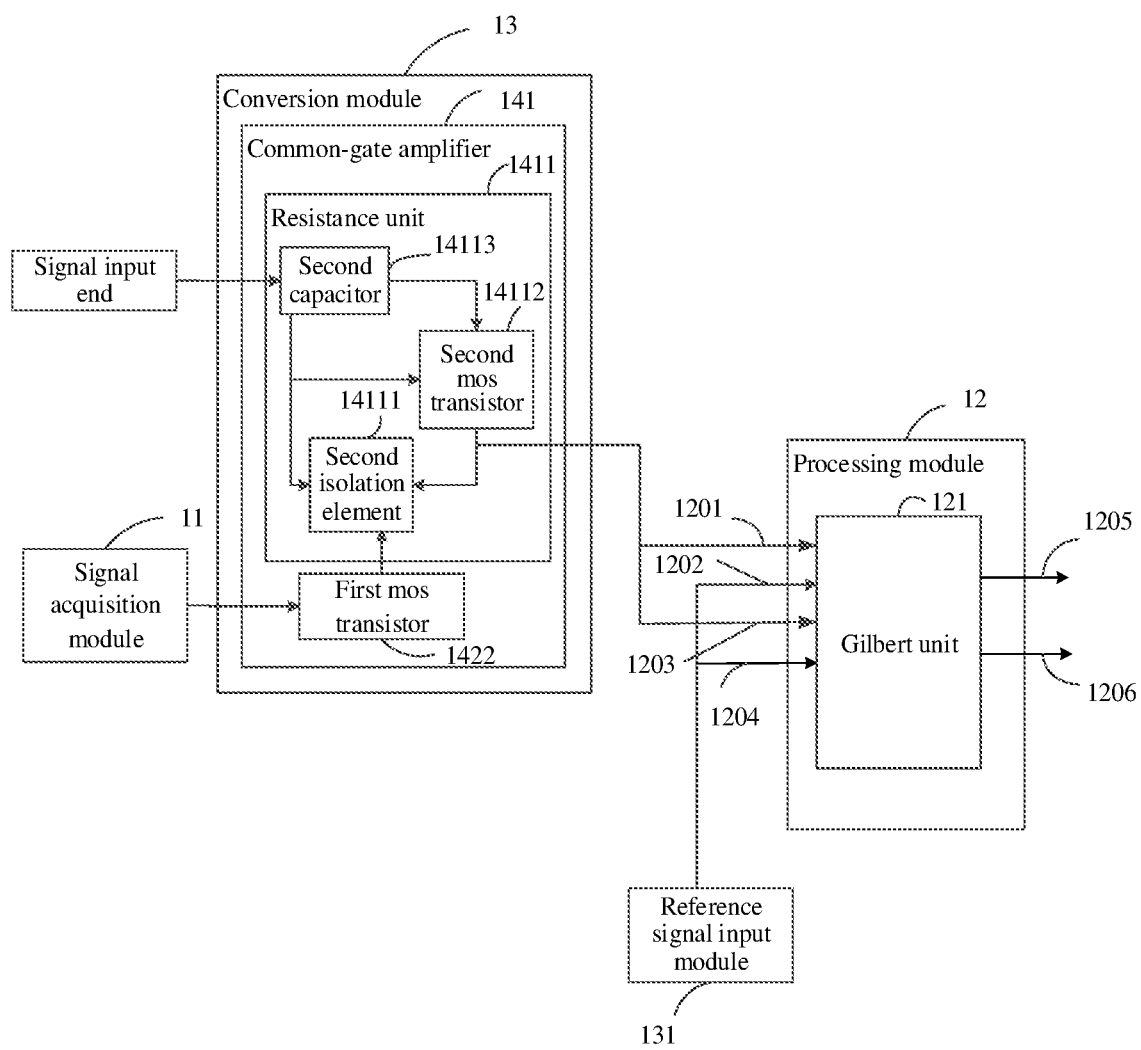
FIG. 3 is a schematic structural diagram showing a device for processing decoherence effect according to another embodiment of the present disclosure.

FIG. 3 is a schematic structural diagram showing a device for processing decoherence effect according to another embodiment of the present disclosure. As shown in FIG. 3, based on the above embodiments, the processing module 12 in the device for processing decoherence effect may include a Gilbert unit 121.

The Gilbert unit 121 has four input terminals and two output terminals. The four input terminals include a first input terminal 1201, a second input terminal 1202, a third input terminal 1203 and a fourth input terminal 1204. The two output terminals include a first output terminal 1205 and a second output terminal 1206.

Both the first input terminal 1201 and the third input terminal 1203 of the Gilbert unit 121 are connected to an output end of the conversion module 13 to acquire the second signal.

Both the second input terminal 1202 and the fourth input terminal 1204 of the Gilbert unit 121 are connected to a reference signal input module 131 to acquire a reference signal.

The Gilbert unit 121 is configured to: compare the second signal with the reference signal to obtain a relative difference, and determine a result of squaring the relative difference as the correlation value.

A difference between a signal outputted from the first output terminal 1205 of the Gilbert unit 121 and a signal outputted from the second output terminal 1206 of the Gilbert unit 121 is the correlation value.

Specifically, the second signal acquired by the first input terminal 1201 and the third input terminal 1203 of the Gilbert unit 121 is formed by the following process. The coherent processing is performed on a background light, a signal light reflected back by the target object, and a local light to obtain a coherent light, and the coherent light is processed by the signal acquisition module 11 to generate a first signal, which may be, for example, a current. The first signal is processed by the conversion module 13 to obtain a second signal, which may be, for example, a voltage.

The reference signal is formed by the following process. The coherent processing is performed on a background light and a local light to obtain a coherent light, and the coherent light is processed by the signal acquisition module 11 to generate a first signal, which may be, for example, a current. The first signal is processed by the conversion module 13 to obtain a second signal, which may be, for example, a voltage. In addition, a bias signal may be set for the processing module 12 to obtain a second signal equal to the reference signal, i.e., a bias voltage equal to the reference signal that is the reference voltage.

Based on the above embodiments, the conversion module 13 includes an amplifying circuit.

One terminal of the amplifying circuit is connected to a signal input end, and the other terminal of the amplifying circuit is connected to the output end of the signal acquisition module 11. The amplifying circuit is configured to convert the first signal outputted by the signal acquisition module 11 through a signal inputted from the signal input end, to obtain the amplified second signal.

Based on the above embodiments, the amplifying circuit in the device for processing decoherence effect includes: a common-gate amplifier 141.

Specifically, the common-gate amplifier 141 includes a resistance unit 1411 and a first mos transistor 1422.

One end of the resistance unit 1411 is connected to the signal input end, the other end of the resistance unit 1411 is connected to a drain of the first mos transistor 1422, and a source of the first mos transistor 1422 is connected to the output end of the signal acquisition module 11.

In this embodiment, in a case that the first signal outputted from the output end of the signal acquisition module 11 is greater than a preset signal value, the first signal can be outputted through the drain of the first mos transistor 1422. That is, the first mos transistor 1422 is equivalent to a unidirectional conducting impedance. The first mos transistor 1422 can be conducing only when the first signal outputted from the output end is large enough. Further, the first signal can only be transmitted from the signal acquisition module 11 to the resistance unit 1411 through the first mos transistor 1422, and the first signal cannot be reversely transmitted from the resistance unit 1411 to the signal acquisition module 11.

Specifically, in the case that the first signal outputted from the output end of the signal acquisition module 11 is greater than the preset signal value, the first signal can be outputted through the drain of the first mos transistor 1422, and the first signal is processed by means of the output signal of the signal input end to obtain an amplified second signal.

Further, based on the above embodiments, the resistance unit 1411 includes: a second mos transistor 14111, a second isolation element 14112, and a second capacitor 14113.

The signal input end is connected to one end of the second capacitor and a source of the second mos transistor. The other end of the second capacitor is connected to a gate of the second mos transistor and one end of the second isolation element. The other end of the second isolation element is connected to a drain of the second mos transistor and the drain of the first mos transistor 1422.

Figure 4:
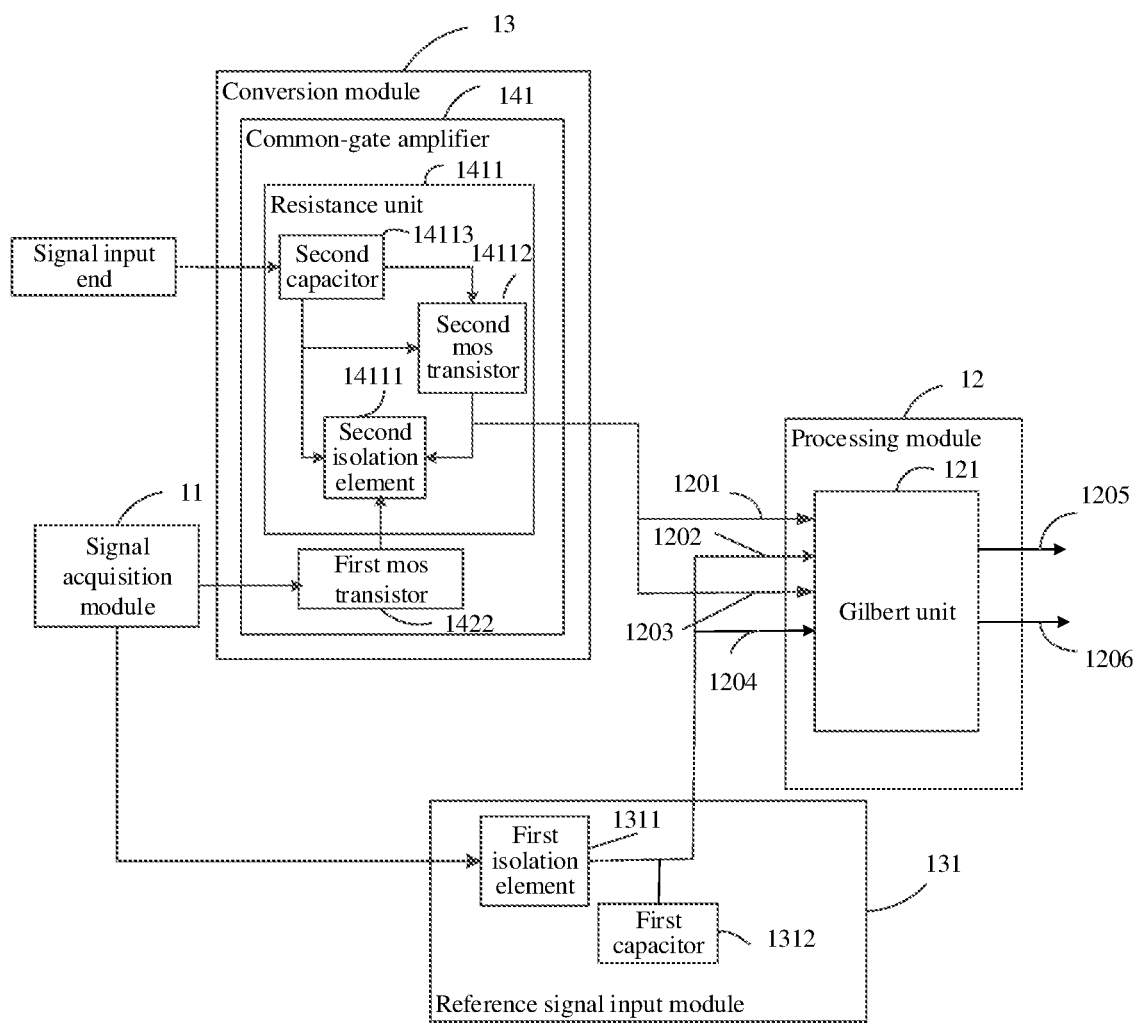
FIG. 4 is a schematic structural diagram showing a device for processing decoherence effect according to another embodiment of the present disclosure.

FIG. 4 is a schematic structural diagram showing a device for processing decoherence effect according to another embodiment of the present disclosure. As shown in FIG. 4, based on the above embodiments, the reference signal input module 131 includes: a first isolation element 1311 and a first capacitor 1312.

One end of the first capacitor 1312 is connected between the first isolation element 1311 and the processing module 12, and the other end of the first capacitor 1312 is grounded. The first capacitor 1312 is configured to: store charges corresponding to a third signal in a case that the first isolation element 1311 is conducting. The third signal includes a signal into which the signal acquisition module 11 converts a background light.

The first isolation element 1311 is provided between the signal acquisition module 11 and the processing module 12, and is configured to control conducting or non-conducting between the signal acquisition module 11 and the processing module 12. In the case of conducting, the charges outputted by the signal acquisition module 11 are transferred to the first capacitor 1312, so that in the case of non-conducting, the signal in the case of conducting is inputted to the second input terminal 1202 and the fourth input terminal 1204 of the Gilbert cell 121.

Figure 5:
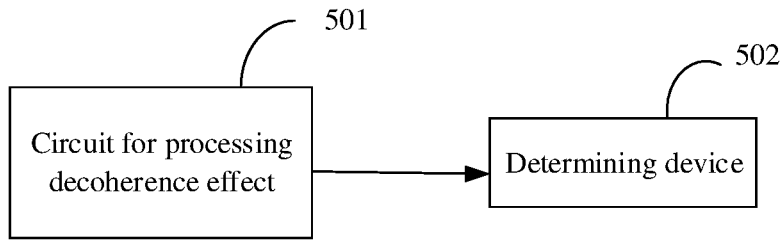
FIG. 5 is a schematic structural diagram showing a system for processing decoherence effect according to an embodiment of the present disclosure.

FIG. 5 is a schematic structural diagram showing a system for processing decoherence effect according to an embodiment of the present disclosure. As shown in FIG. 5, the system for processing decoherence effect includes: at least two devices 501 for processing decoherence effect shown in any one of FIG. 1 to FIG. 4, and a determining device 502.

An input end of the determining device 502 is connected to an output end of each of the devices for processing decoherence effect. The determining device is configured to add all correlation values to obtain a sum of the coherent light after decoherence.

Further, the determining device is further configured to compare the sum with a preset value to determine a time when the signal acquisition module acquires the coherent light.

Specifically, each pixel in a receiving surface for laser ranging may be provided with at least one device 501 for processing decoherence effect. After the coherent light passes through the device 501 for processing decoherence effect, the obtained correlation value is greater than 0. The correlation values respectively outputted by the devices for processing decoherence effect in pixels are added to obtain a correlation value of a sum of values of the first signal in all the pixels, i.e., the sum of the correlation values. Since the correlation value is greater than 0, serious distortion of the calculation results caused due to the first signal of different polarities can be avoided. Further, the sum of the correlation values respectively outputted by the devices for processing decoherence effect in the pixels is compared with the preset value. If the sum of all the correlation values is greater than or equal to the preset value, it can be determined that the light received by the receiving surface has a sudden change, and a time when the light received by the receiving surface changes suddenly is determined as the time when the signal acquisition module acquires the coherent light. A distance between the target object and the light source is determined according to the time when the light is emitted from the light source, the time when the signal acquisition module acquires the coherent light, and the light speed. In this way, the correlation value outputted by each device for processing decoherence effect is a value greater than 0, avoiding serious distortion of the calculation result caused due to the first signal of different polarities, thereby improving the accuracy of laser ranging.

Further, based on the above embodiments, the system for processing decoherence effect may further include: a signal amplifying circuit.

The signal amplifying circuit is provided between the determining device and the devices for processing decoherence effect. The signal amplifying circuit is configured to amplify the correlation value.

In this embodiment, by amplifying the correlation value, the correlation value can be increased, and the correlation value can be further improved, thereby further improving the accuracy of comparing the sum of the correlation values with the preset value.

Figure 6:
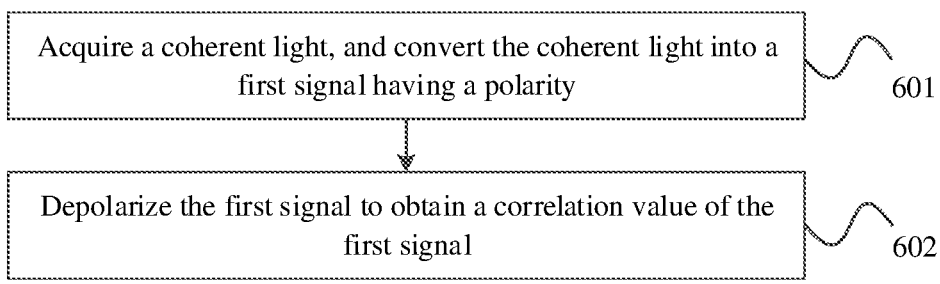
FIG. 6 is a schematic diagram showing a method for processing decoherence effect according to an embodiment of the present disclosure.

FIG. 6 is a schematic diagram showing a method for processing decoherence effect according to an embodiment of the present disclosure. As shown in FIG. 6, the method for processing decoherence effect is based on the device for processing decoherence effect as shown in any one of FIGS. 1 to 4. The method includes the following steps 601 and 602.

In step 601, a coherent light is acquired, and the coherent light is converted into a first signal having a polarity.

In step 602, the first signal is depolarized to obtain a correlation value of the first signal.

The correlation value in this embodiment is a value greater than 0. The coherent light includes a light obtained by loading a signal light into a local light, where the signal light is formed by a target object reflecting a laser light emitted from a light source.

Specifically, after the light source emits the laser light to the target object, the signal light reflected back by the target object is generally loaded into the local light due to low power of the signal light, so as to obtain the coherent light. Further, the coherent light is outputted as a first signal varying in the form of a sine wave through the signal acquisition module 11. That is, a first signal polarity outputted by the signal acquisition module 11 may be positive or negative. For example, the first signal may be an analog signal. The signal having the polarity is inputted to the processing module 12. The first signal is depolarized by the processing module 12 to obtain the correlation value of the first signal, where the correlation value is a value greater than 0. The correlation value may be an absolute value of the first signal, or a value in proportion to the absolute value of the first signal. In addition, the correlation value may also be obtained by the following process. The first signal is controlled to pass through a resistor, to obtain a second signal when the first signal passes through the resistor. In this case, the correlation value may be an absolute value of the second signal, or a value in proportion to the absolute value of the second signal. The explanation of the correlation value herein is merely exemplary and is not limited thereto.

In this embodiment, the signal acquisition module and the processing module 12 are provided. The output end of the signal acquisition module is connected to the input end of the processing module 12. The signal acquisition module is configured to acquire the coherent light and convert the coherent light into the first signal having the polarity. The processing module 12 is configured to depolarize the first signal to obtain the correlation value of the first signal, where the correlation value is a value greater than 0. In this way, the first signal is depolarized, so that the correlation value greater than 0 can be summed or processed in another manner, avoiding serious distortion of the calculation result caused due to the first signal of different polarities, thereby improving the accuracy of laser ranging.

Based on the above embodiments, the method may further include: converting the first signal into a second signal.

Figure 7:
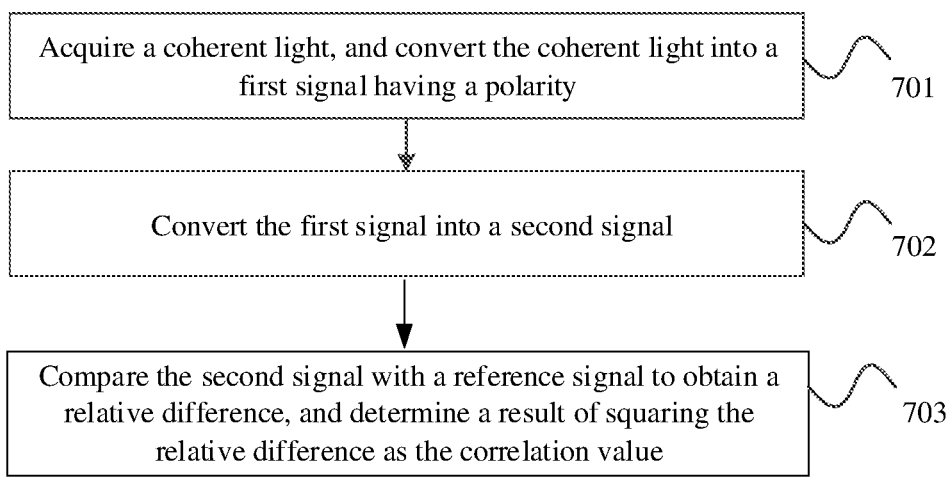
FIG. 7 is a schematic diagram showing a method for processing decoherence effect according to another embodiment of the present disclosure.

FIG. 7 is a schematic diagram showing a method for processing decoherence effect according to another embodiment of the present disclosure. As shown in FIG. 7, the method for processing decoherence effect includes the following steps 701 to 703.

In step 701, a coherent light is acquired, and the coherent light is converted into a first signal having a polarity.

In step 702, the first signal is converted into a second signal.

Specifically, the first signal is converted through a signal to obtain an amplified second signal.

In step 703, the second signal is compared with a reference signal to obtain a relative difference, and a result of squaring the relative difference is determined as the correlation value.

In this embodiment, the first signal is depolarized, so that the correlation value greater than 0 can be summed or processed in another manner, avoiding serious distortion of the calculation result caused due to the first signal of different polarities, thereby improving the accuracy of laser ranging.

Further, after depolarizing the first signal to obtain the correlation value of the first signal, the method further includes:
adding all correlation values to obtain a sum of the coherent light after decoherence.

It should further be noted that, technical features described in the above embodiments can be combined in any suitable manner in the absence of contradiction. Further, different implementations in the present disclosure can be combined in any manner without departing from the idea of the present disclosure. These combinations should be regarded as contents disclosed in the present disclosure. The present disclosure is not limited to structures described above. The scope of the present disclosure is only defined by the appended claims.

The invention claimed is:

1. A device for processing decoherence effect, the device comprising:
   a signal acquisition module; and
   a processing module, wherein
   an output end of the signal acquisition module is connected to an input end of the processing module;
   the signal acquisition module is configured to acquire a coherent light and convert the coherent light into a first signal having a polarity; and
   the processing module is configured to depolarize the first signal to obtain a correlation value of the first signal;
   wherein the processing module comprises one of the following: a unidirectional conducting unit, a class B power amplifier, and a multiplier,
   a conversion module provided between the signal acquisition module and the processing module, wherein the conversion module is configured to convert the first signal into a second signal;
   wherein the processing module comprises a Gilbert unit having four input terminals and two output terminals, wherein the four input terminals comprise a first input terminal, a second input terminal, a third input terminal and a fourth input terminal, and the two output terminals comprise a first output terminal and a second output terminal;
   both the first input terminal and the third input terminal of the Gilbert unit are connected with an output end of the conversion module to acquire the second signal;
   both the second input terminal and the fourth input terminal of the Gilbert unit are connected to a reference signal input module to acquire a reference signal;
   the Gilbert unit is configured to: compare the second signal with the reference signal to obtain a relative difference, and determine a result of squaring the relative difference as the correlation value; and
   a difference between a signal outputted from the first output terminal of the Gilbert unit and a signal outputted from the second output terminal of the Gilbert unit is the correlation value.

2. The device according to claim 1, wherein the conversion module comprises: an amplifying circuit, and wherein
one terminal of the amplifying circuit is connected to a signal input end, and the other terminal of the amplifying circuit is connected to the output end of the signal acquisition module, and the amplifying circuit is configured to convert the first signal outputted by the signal acquisition module through a signal inputted from the signal input end, to obtain the amplified second signal.

3. The device according to claim 2, wherein the amplifying circuit comprises a common-gate amplifier.

4. The device according to claim 3, wherein the common-gate amplifier comprises: a resistance unit and a first mos transistor, and wherein
one end of the resistance unit is connected to the signal input end, the other end of the resistance unit is connected to a drain of the first mos transistor, and a source of the first mos transistor is connected to the output end of the signal acquisition module.

5. The device according to claim 4, wherein the resistance unit comprises: a second mos transistor, a second isolation element and a second capacitor, and wherein
the signal input end is connected to one end of the second capacitor and a source of the second mos transistor, the other end of the second capacitor is connected to a gate of the second mos transistor and one end of the second isolation element, and the other end of the second isolation element is connected to a drain of the second mos transistor and the drain of the first mos transistor.

6. The device according to claim 1, wherein the reference signal input module comprises: a first isolation element and a first capacitor, and wherein
one end of the first capacitor is connected between the first isolation element and the processing module, the other end of the first capacitor is grounded, and the first capacitor is configured to: store charges corresponding to a third signal in a case that the first isolation element is conducting, wherein the third signal includes a signal into which the signal acquisition module converts a background light; and
the first isolation element is provided between the signal acquisition module and the processing module and is configured to control conducting or non-conducting between the signal acquisition module and the processing module, wherein in the case of conducting, the charges outputted by the signal acquisition module are transferred to the first capacitor, so that in the case of non-conducting, the signal in the case of conducting is inputted to the second input terminal and the fourth input terminal of the Gilbert unit.

\* \* \* \* \*